(12) United States Patent
Lee

(10) Patent No.: US 11,960,022 B2
(45) Date of Patent: Apr. 16, 2024

(54) SPATIAL COORDINATE POSITIONING SYSTEM

(71) Applicant: KOREA INSTITUTE OF INDUSTRIAL TECHNOLOGY, Cheonan-si (KR)

(72) Inventor: Ho-Jae Lee, Gwangju (KR)

(73) Assignee: KOREA INSTITUTE OF INDUSTRIAL TECHNOLOGY, Cheonan-si (KR)

( * ) Notice: Subject to any disclaimer, the term of this patent is extended or adjusted under 35 U.S.C. 154(b) by 305 days.

(21) Appl. No.: 17/434,758

(22) PCT Filed: Apr. 18, 2019

(86) PCT No.: PCT/KR2019/004718
§ 371 (c)(1),
(2) Date: Aug. 30, 2021

(87) PCT Pub. No.: WO2020/213766
PCT Pub. Date: Oct. 22, 2020

(65) Prior Publication Data
US 2022/0163618 A1    May 26, 2022

(51) Int. Cl.
*G01S 5/14* (2006.01)
*G01B 5/004* (2006.01)
*G01S 5/02* (2010.01)

(52) U.S. Cl.
CPC .............. *G01S 5/14* (2013.01); *G01B 5/004* (2013.01); *G01S 5/0236* (2013.01)

(58) Field of Classification Search
CPC ......... G01B 5/004; G01S 17/08; G01S 17/88; G01S 5/0236; G01S 5/14
See application file for complete search history.

(56) References Cited

U.S. PATENT DOCUMENTS

2009/0237639 A1* 9/2009 Shinozaki ............... G01S 17/42
356/4.01

FOREIGN PATENT DOCUMENTS

| JP | 2009-103497 A | 5/2009 |
| KR | 10-2021-0021174 A | 3/2001 |
| KR | 10-2012-0074119 A | 7/2012 |
| KR | 10-2013-0115725 A | 10/2013 |
| KR | 10-1342215 B1 | 12/2013 |
| KR | 10-1874570 B1 | 7/2018 |
| KR | 10-2019-0109830 A | 9/2019 |

OTHER PUBLICATIONS

International Search Report dated Jan. 17, 2020 for PCT/KR2019/004718.

* cited by examiner

*Primary Examiner* — Nader Bolourchi
(74) *Attorney, Agent, or Firm* — CANTOR COLBURN LLP

(57) ABSTRACT

The present invention relates to a spatial coordinate positioning system, particularly to a spatial coordinate positioning system which is capable of measuring a position of spatial positioning target in high-precision by calculating spatial coordinates of assistant point stations at a predetermined interval on the basis of a coordinate of a ground base point station and distance information between the assistant point stations in a space where the plurality of assistant point stations are installed of which coordinates were unknown.

11 Claims, 5 Drawing Sheets

SPATIAL COORDINATE POSITIONING SYSTEM

BACKGROUND

Technical Field

The present invention relates to a spatial coordinate positioning system, particularly to a spatial coordinate positioning system which is capable of measuring a position of spatial positioning target in high-precision by calculating spatial coordinates of assistant point stations at a predetermined interval on the basis of a coordinate of a ground base point station and distance information between the assistant point stations in a space where the plurality of assistant point stations are installed of which coordinates were unknown.

Description of the Related Art

A satellite navigation system refers to a system that provides a user with user's current position and a route to a desired destination the user by using satellites. Global Positioning System (GPS) is the most prevalent Global Navigation Satellite System (GNSS) provided by the United States.

A typical use of such a satellite navigation system is Car Navigation system. The Car Navigation System refers to a system that identifies the current position of a vehicle to provide a driver with an optimal route to user's desired destination and guides the driver along the provided route. In general, such a Car Navigation System calculates the current position of a vehicle using a GPS sensor and performs route guidance from the current position to a destination.

Meanwhile, recently, an automated driving system for handling the whole task of driving has been developed. In the automated driving system, in order to prevent vehicle lane departure, the accuracy in measuring the position of a vehicle should be high within several centimeters. However, there is a drawback that position calculation errors of the GPS currently in use are high approximating several meters.

Further, since there are limitations on the lifespan and maintenance of satellites constituting the satellite navigation system, a complementary method is required therefor.

Accordingly, in the applicant's patent application No. KR 10-2016-0122139, disclosed is a high-precision spatial information measurement support system which is capable of measuring a position of a positioning target by using several ground base point stations and assistant point stations installed on the ground to increase position calculation accuracy compared to GPS.

However, when actually implementing the high-precise spatial information measurement support system of patent application No. KR 10-2016-0122139, there is a drawback in scalability that a number of ground base point stations at a predetermined interval should be installed within a distance that is capable of securing a visible distance from the national reference point of which spatial coordinates are known. That is, large cost, long-term construction and maintenance will be entailed when installing the ground base point stations at a predetermined interval nationwide, it is likely difficult to implement the aforementioned patent application practically.

SUMMARY OF THE INVENTION

The present invention is provided to solve the aforementioned drawbacks, and the object of this invention is to provide a system which is capable of ensuring scalability in the positioning area, reducing the installation cost and measuring high-precision spatial coordinates for the positioning target without long-term construction. Also, the system is capable of securing an efficient system management method To this end, a spatial coordinate positioning system according to the present invention includes a ground base point station of which position information was already determined and which has a wireless distance measurement function, a plurality of assistant point stations which have a wireless distance measurement function, and an assistant point position calculation server which receives distance information between the ground base point station and the assistant point station, wireless distance information between the ground base point station and the assistant point station and wireless distance information between the assistant point stations at a predetermined time to calculate position information of the assistant point station at a predetermined time on the basis of the multiple distance information and the position information of the ground base point station.

Further, the ground base point station or the assistant point station according to the present invention may include, besides the wireless distance measurement function, a laser module which includes a light source emitting laser and a light receiving portion detecting reflected laser, a distance measurement portion which calculates ultra-precise distance information with other ground base point stations or assistant point stations on the basis of time information related to the emission and detection of laser, and a control portion.

Further, the assistant point station according to the present invention includes a wireless communication portion which transmits and receives a radio signal to and from other assistant point stations, transmits wireless distance information with other assistant point stations to the assistant point position calculation server and receives position information of the assistant point from the assistant point position calculation server, a distance measurement portion which calculates wireless distance information with the other assistant point stations, and a control portion which generates and transmits broadcast information composed of the position information and time information of the assistant point station to transmit the broadcast information through the wireless communication portion.

Further, a method for calculating position information of assistant point station according to the present invention calculates spatial coordinates of assistant point stations by an assistant point position calculation device of a spatial coordinate positing system composed of a ground base point station of which spatial coordinate was known and a plurality of assistant point stations of which spatial coordinates were not known, the method including steps of: receiving distance information between the ground base point station and a specific assistant point station, receiving wireless distance information between the plurality of assistant point stations, obtaining each equation with respect to the wireless distance information and generating a system of equations for the each equation and calculating spatial coordinates of the plurality of assistant point stations by solving the system of equations.

Further, the spatial coordinate position system according to the present invention includes a ground base point station of which position information was already determined and which has a wireless distance measurement function, a plurality of assistant point stations of which position information was not known but variable and which have a wireless distance measurement function and an assistant point position calculation server which receives distance information between the ground base point station and the assistant point station, wireless distance information between the ground base point station and the assistant point station and wireless distance information between the assistant point stations at a predetermined time and calculates position information of the assistant point station at a predetermined time, on the basis of the multiple distance information and the position information of the ground base point station.

Further, the spatial coordinate positioning system according to the present invention includes a ground base point station of which position information was already determined and which has a wireless distance measurement function and a plurality of assistant point stations of which position information was not known but variable and which has a wireless distance measurement function, the ground base point station receiving wireless distance information between the assistant point stations at a predetermined time and calculating position information of the assistant point station at a predetermined time, on the basis of the multiple distance information and its own position.

Advantageous Effects

As aforementioned, the present invention has the effect of measuring a position of a positioning target in high-precision in the space where a plurality of assistant point stations of which inaccurate spatial coordinates of the initial installation stage may be variable is installed. That is, the present invention is capable of accurately calculating coordinates of the assistant point stations which may be variable differently from the initial installation position, at a predetermined time, on the basis of the spatial coordinate of the ground base point station which was already known, the distance information between the ground base point and the assistant point station and distance information between the assistant point and the assistant point station. Thereby, there is an effect of measuring the position of the positioning target existing on a positioning space in high-precision.

BRIEF DESCRIPTION OF THE DRAWINGS

The accompanying drawings in the specification illustrate an embodiment of the present invention. The technical essence of the present invention will be more clearly understood from the following detailed description taken in conjunction with the accompanying drawings. Therefore, the present invention will not be interpreted to be limited to the drawings in which.

DETAILED DESCRIPTION OF THE EMBODIMENTS

Figure 1:
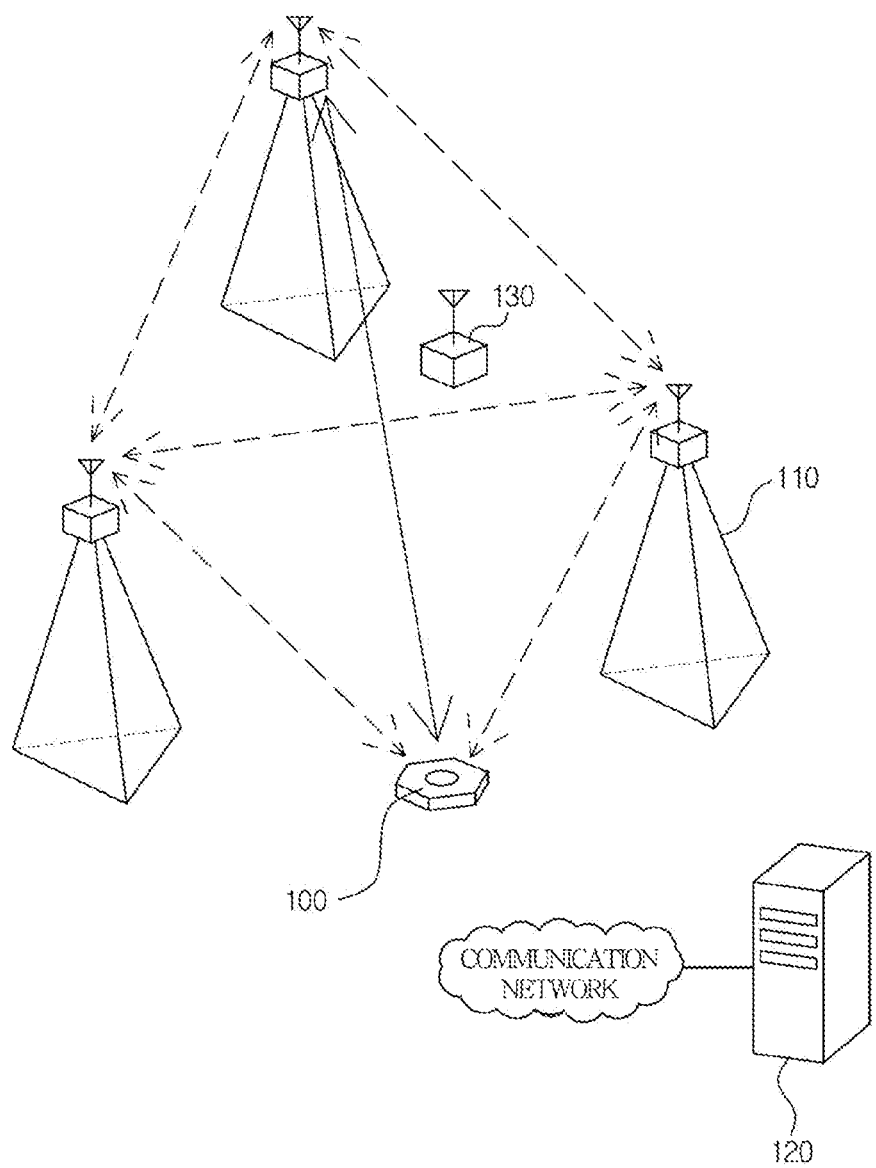
FIG. 1 is a schematic configuration view of a spatial coordinate position system according to the present invention.

The terms or words used in the present specification and claims should not be construed as being limited to their usual or dictionary meanings but should be interpreted as a meaning and concept consistent with the technical idea of the present invention on the basis of principal that the inventor may appropriately define the concept of terms in order to describe his own invention in the best way.

Accordingly, the embodiments described in the present specification and the configurations shown in the drawings are only the most preferred embodiments but do not represent the whole technical sprit of the present invention. Thus, it should be understood that there may be various equivalents and modified embodiments which are capable of replacing them at the time of filing the present application.

Hereinafter, the embodiment of the present invention will be described in detail with reference to the accompanying drawings.

FIG. 1 is a schematic configuration view of a spatial coordinate position system according to the present invention. Referring to FIG. 1, the spatial coordinate position system includes a ground base point station 100, an assistant point station 110, an assistant point position calculation server 120, a position calculation terminal 130, etc.

Prior to the description of each configuration of the spatial coordinate positioning system, position information means spatial coordinates (x, y, z) of each object, distance information means a distance between two objects and broadcast information means wireless data that includes position information and time information. The spatial coordinates and the position information may be often used interchangeably.

The ground base point station 100 may be installed spacing as far as possible under the condition that satisfies an environment in which a visible distance is securable, and the spatial coordinates are measured retroactively from the national reference point or defined as constant values which are not changed by the positioning system.

A wireless distance measurement function is a function of measuring a distance between two objects on the basis of a radio signal such as Wi-Fi, UWB, etc. to calculate wireless distance information (represented by dotted lines). Also, this is referred to an ultra-precise distance measurement function that measures a distance between two objects existing within the visible distance using laser to calculate an ultra-precise distance information (represented by a solid line).

The ground base point station 100 may transmit the ultra-precise measurement information using laser to the assistant point position calculation server 120 and may transmit wireless distance information with an adjacent assistant point station 110 to the assistant point position calculation server 120.

Further, the ground base point station 100 may collect wireless distance information from the plurality of assistant point stations 110 to transmit the collected wireless distance information to the assistant point position calculation server 120.

The assistant point station 110 may be installed at an interval of several tens of meters on the ground and has a wireless distance measurement function. A distance between two of the adjacent assistant point stations 110 may be measured through the wireless distance measurement function of the assistant point station 110. Further, an ultra-precise distance measurement function using laser may be added to the assistant point station in order to improve the position precision of an assistant point.

A spatial coordinate of the assistant point station 110 is not such a value defined at the installation stage like the ground base point station 100. The spatial coordinate of the assistant point station 110 is a value changeable over time differently from an initial installation position. In the present invention, the assistant point position calculation server 120 calculates the spatial coordinate of the assistant point station 110 in real-time, followed by calibration.

The spatial coordinate of the assistant point station 110 is updated by receiving the calculated spatial coordinate from the assistant point position calculation server 120 at a predetermined time. Accordingly, even if the position of the assistant point is changed by external environment such as vibration, draft, collision, etc. or intentionally changed for a special purpose, accurate position calculation of a moving object may be ensured by the spatial coordinate of the assistant point updated by the assistant point position calculation server.

Each of the assistant point stations 110 may transmit wireless distance information to the assistant point position calculation server 120. However, when the plurality of assistant point stations 110 are composed of a main assistant point station and a sub assistant point station, the main assistant point station may collect wireless distance information from the sub assistant point station to transmit the collected wireless information to the assistant point position calculation server 120.

The assistant point position calculation server 120 receives distance information from the ground base point station 100 and the assistant point station 110 and calculates spatial coordinates of each of the assistant point station 110 by using the spatial coordinate and distance information of the ground base point station 100. The assistant point position calculation server 120 provides the spatial coordinates of the assistant point stations 110 to the assistant point stations 110 at a predetermined interval.

The position calculation terminal 130 receives wireless information transmitted from the ground base point station 100 or the assistant point station 110 to calculate its own position information, alternatively receiving its own position information calculated in the ground base point or the assistant point.

The position calculation terminal 130 obtains a distance spaced apart from the ground base point station 100 or the assistant point station 110 to calculate the position information by fording out a point at which each sphere having the distance as a radius intersects.

The position calculation terminal 130 may be any type of apparatus or device provided that it has a function of transmitting and receiving a radio signal to and from the ground base point station 100 or the assistant point station 110 and of receiving broadcast information therefrom. For example, the position calculation terminal 130 may be a portable terminal such as a smartphone and may be mounted on various objects such as automobile, ships and drones, including people.

In FIG. 1, the assistant point position calculation server 120 connected to a communication network is independently present in order to calculate the spatial coordinates of the assistant point station 110. However, the ground base point station 100 may be provided with a function of calculating the position information of the assistant point station 110 without a separate assistant point position calculation server 120.

When the ground base point station 100 includes the function of calculating the position information of the assistant point station 110, the ground base point station 100 collects wireless distance information from the assistant point station 110 to calculate position information of each of the assistant point stations 110 on the basis of distance information between a specific assistant point and itself, wireless distance information collected from the each of the assistant point stations 110 and its own position information.

Figure 2:
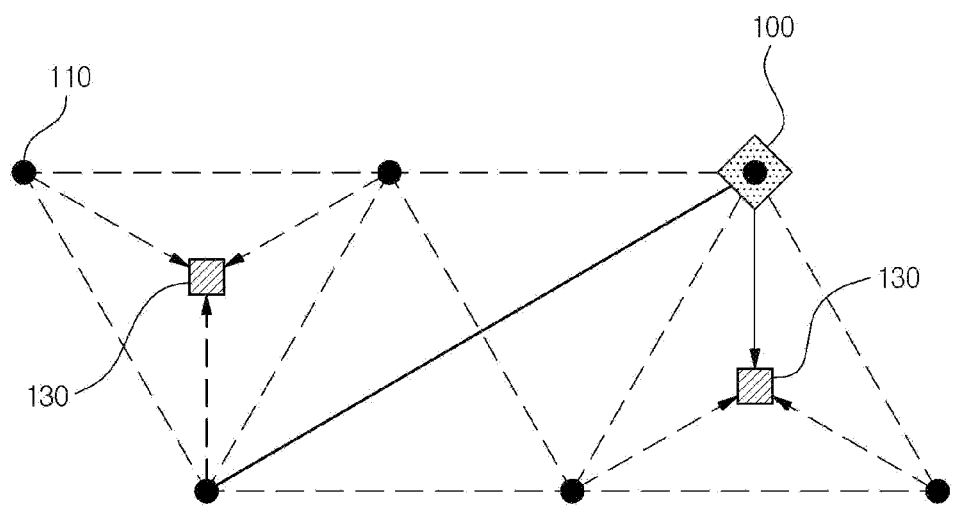
FIG. 2 is a view showing an expanded area (domain) of a basic unit cell configured by a ground base point station and assistant point stations according to the present invention.

FIG. 2 is a view showing an expanded area (domain) of a basic unit cell configured by a ground base point station and assistant point stations according to the present invention. Referring to FIG. 2, one ground base point station 100 and five assistant point stations 110 are connected in a triangle form to configure four positioning cells and the position calculation terminal 130 is present in the cell.

In FIG. 2, shown are four position cells configured by one of the ground base point station 100. However, as the number of the assistant point stations increases, the number of the positioning cells also increases. When the ground base point station 100 exists at an interval of several kilometers, other positioning cells are generated successively by assistant point stations adjacent to the ground base point station 100.

The ground point station 100 calculates super-precise distance information (represented by a solid line) with a specific assistant point station 110 through a laser distance measurement function and also calculates wireless distance information (represented by dotted lines) with the other assistant point stations 110 in the vicinity through a wireless distance measurement function.

The position information of each of the assistant point station 110 may be calculated by using the distance information and multiple wireless distance information calculated as the above as well as the spatial coordinate of the ground base point station 100 which was already known.

The spatial coordinates of the assistant point station 110 may be represented as (x, y, z). Since a height of the assistant point station 110, that is, the Z value is a value that is easily measurable by measuring a distance vertical from the ground when the assistant point station 110 is installed, the number of unknowns of the spatial coordinate of the assistant point station 110 may be reduced to two (x, y).

Accordingly, in the positioning cell configured by one of the ground base point station 100 and five of the assistant point stations 110 as shown in FIG. 2, since the number of the unknowns of the spatial coordinate of the assistant point station 110 is ten (2*10=10) and the total number of pieces of the calculated distance information is ten, that is, one piece of laser information and nine pieces of distance information, ten equations may be derived from the ten pieces of the distance information. Then, the ten unknowns are obtainable by solving a system of equations generated from the ten equations, consequently this allowing obtaining the spatial coordinate (x, y) of each of the assistant point station 10.

When each of the assistant point stations 110 transmits broadcast information composed of its own position information, that is, spatial coordinate and time information to the vicinity at a predetermined interval, the position calculation terminal 130 existing in the positioning cell receives the broadcast information from the assistant point stations 110 in the vicinity and to secure its current position by using the received broadcast information.

Figure 3:
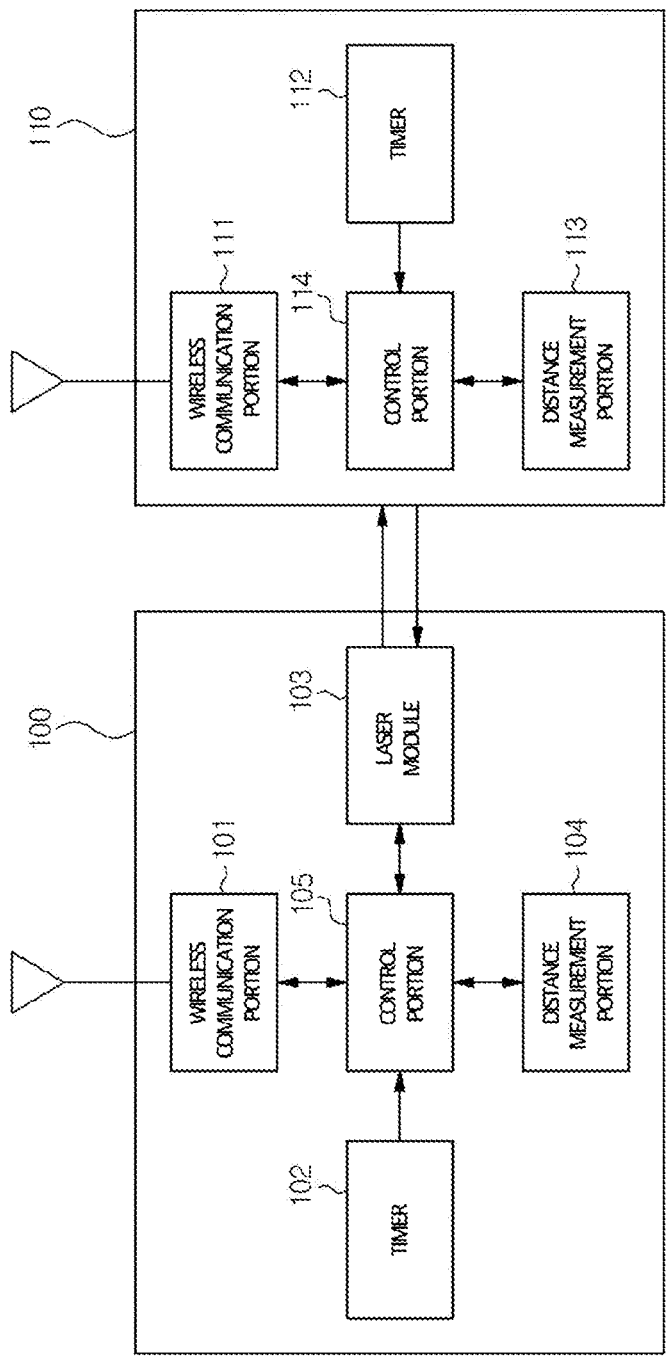
FIG. 3 is a configuration view of each interior of the ground base point station and the assistant point station according to the present invention.

FIG. 3 is a configuration view of each interior of the ground base point station and the assistant point station according to the present invention. Referring to FIG. 3, the ground base point station 100 includes a wireless communication portion 101, a timer 102, a laser module 103, a distance measurement portion 104 and a control portion 105, etc.

The wireless communication portion 101 transmits and receives a radio signal to and from the assistant point stations 110 in the vicinity and transmits distant information with the assistant point stations 110 in the vicinity to the assistant point position calculation server 120. The wireless communication portion 101 may be configured as a short-range communication module such as Wi-Fi, ultra-wideband communication (UWB), etc.

Further, the wireless communication portion 101 receives wireless distance information from the assistant point station 110 to transmit the received wireless distance information to the assistant point position calculation server 120, alternatively to receive position information of the assistant point station 110 from the assistant point position calculation server 120, thereby transmitting the position information to the assistant point station 110.

The timer 102 is synchronized with time information of the assistant point station 110 to output a time clock signal. Time information of the timer 102 is necessary to calculate laser distance information and wireless distance information.

In FIG. 3, the ground base point station 100 receives time information through the timer 102 but may receive time information from a GPS receiver. The laser module 103 includes a light source emitting laser and a light receiving portion detecting reflected laser. The laser module 103 emits laser light and detects the laser light reflected by the assistant point station 110 and returned.

The distance measurement portion 104 calculates ultra-precise distance information with the ground base point or assistant point station 110 reflecting the laser by using time information related to the emission and detection of the laser.

The control portion 105 is a part that controls each configuration element of the ground base point station 100 overall. The control portion 105 according to the present invention receives time information from the synchronized timer 102 or the GPS receiver and controls driving of the laser module 103, allowing the laser distance information calculated in the distant measurement portion 104 to be transmitted to the assistant point position calculation server 120 through the wireless communication portion 101.

The assistant point station 110 includes a wireless communication 111, a timer 112, a distance measurement portion 113, a control portion 114, etc., similarly to the internal configuration of the ground base point station 100. The wireless communication portion 111 transmits and receives a radio signal to and from the ground base point station 100 and other assistant point stations 110, transmit wireless information with other assistant point stations to the assistant point position calculation server 120 and receive position information of the assistant point station from the assistant point position calculation server 120. The wireless communication portion 111 transmits broadcast information composed of the position information and time information of the assistant point station at a predetermined interval. Further, the wireless communication portion 111 may transmit wireless distance information to the ground base point station 100 or other assistant point stations 110.

The timer 112 is synchronized with the timer of the ground base point station 100 and other assistant point stations 110 to output a time clock signal. The assistant point station 110 may use time information generated in the GPS receiver instead of the internal timer 112.

The distance measurement portion 113 calculates wireless distance information with other assistant point stations on the basis of the radio signal and time information transmitted and received to and from the ground base point station 100 or other assistant point stations 110.

The control portion 114 is a part that controls each configuration element of the assistant point station 110 overall. The control portion 114 according to the present invention controls the wireless distance information calculated in the distance measurement portion 113 to be transmitted to the assistant point position calculation server 120 at a predetermined interval through the wireless communication portion 110 and generates broadcast information from the position information of the assistant point station 110 received through the wireless communication portion 111 and the time information received through the timer 112, allowing transmitting the generated broadcast information through the wireless communication portion 111 at a predetermined interval.

Figure 4:
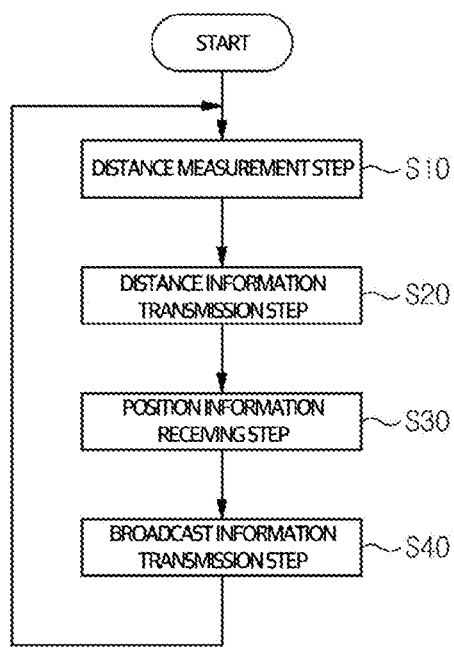
FIG. 4 is a flow chart of a process to be performed in which a position calculation terminal calculates a position of an assistant point in the spatial coordinate position system according to the present invention, FIG. 5 a conceptual view for calculating position coordinates of the assistant point station.

FIG. 4 is a flow chart of a process to be performed in which a position calculation terminal calculates a position of an assistant point in the spatial coordinate position system according to the present invention. Referring to FIG. 4, firstly, in a distance measurement step S10, the ground base point station 100 calculates distance information with a specific assistant point station 110 and each of the assistant point stations 110 calculates wireless distance information with the assistant point stations in the vicinity.

Next, in a distance information transmission step S20, the ground base point station 100 transmits the distance information to the assistant point position calculation server 120 and each of the assistant point stations 110 transmit the wireless distance information to the assistant point position calculation server 120.

According to another embodiment, the ground base point station 100 collects wireless distance information from the assistant point station 110 to transmit the collected distance information to the assistant point position calculation server 120.

Next, in a position information receiving step S30, each of the assistant point stations 110 receives its own position information from the assistant point position calculation server 120. According to another embodiment, each of the assistant point stations 110 may receive its own position information from the ground base point station 100.

Finally, in a broadcast information transmission step S40, each of the assistant point stations 110 transmits time information together with its own position information received at a predetermined interval.

When each of the assistant point stations 110 transmits the broadcast information composed of the position information and the time information, the position calculation terminal 130 may calculate its own position through one-way or two-way distance measurement technology.

Since the aforementioned distance measurement step S10, distance information transmission step S20, position information receiving step S30 and broadcast transmission step S40 are repeated at a predetermined interval to calibrate the position information of each of the assistant point stations 110 in real time, the position calculation terminal 130 may measure its own position accurately on the basis of the calibrated position information even if the external environment is changed.

In the embodiment detailed described above, the ground base point station has both wireless distance and laser distance measurement functions. In a case of the distance measurement way using laser or light, an error is within a few mm allowing very accurate measurement, while an error in a wireless measurement way is relatively large and increases as a mutual distance increases. Accordingly, as using the laser distance information of the ground base point station, it is capable of reduce error rates and calculating the position information of the assistant point station more accurately.

However, when more assistant point stations are installed by a narrowing installation interval even if installation costs increase, the laser distance information of the ground base point station may be omitted in the process of calculating the position information of the assistant point station.

Figure 5:
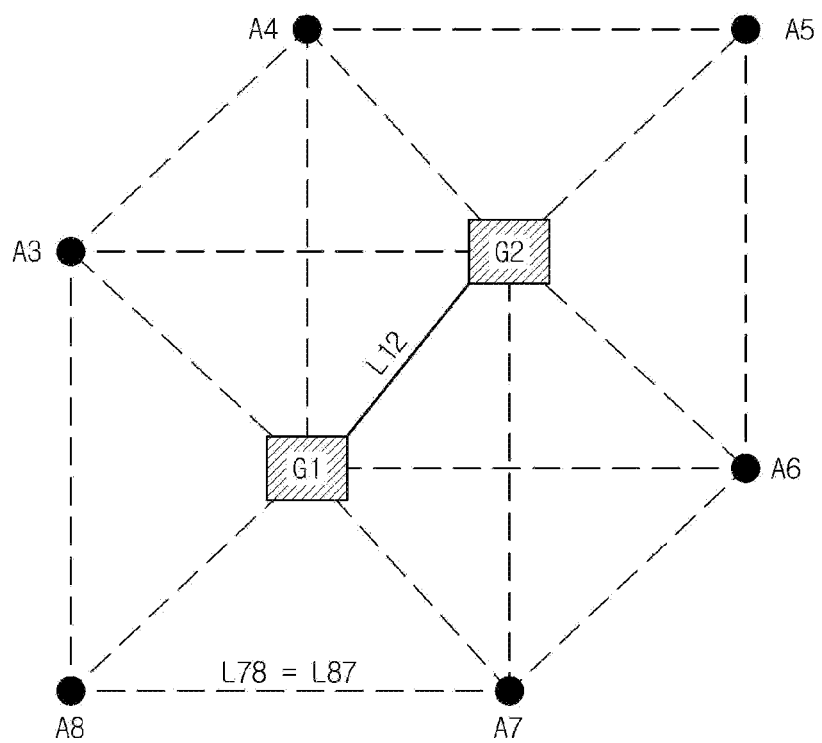

FIG. 5 a conceptual view for calculating position coordinates (x, y, z) of the assistant point station. Firstly, supposed are two ground base point stations G1 and G2 (M=2) and six assistant point stations, A3 to A8 (N=6). Herein, already known are a position coordinate of G1 (x1, y1, z1), a position coordinate of G2 (x1, y2, z2) and a distance between G1 and G2 (L12=L21), wherein the distance between the stations is represented by the following equations.

$$L_{12}=L_{21}=\sqrt{(X_1-X_2)^2+(Y_1-Y_2)^2+(Z_1-Z_2)^2}$$

$$L_{13}=L_{31}=\sqrt{(X_1-X_3)^2+(Y_1-Y_3)^2+(Z_1-Z_3)^2}$$

$$L_{14}=L_{41}=\sqrt{(X_1-X_4)^2+(Y_1-Y_4)^2+(Z_1-Z_4)^2}$$

$$L_{15}=L_{51}=\sqrt{(X_1-X_5)^2+(Y_1-Y_5)^2+(Z_1-Z_5)^2}$$

$$L_{16}=L_{61}=\sqrt{(X_1-X_6)^2+(Y_1-Y_6)^2+(Z_1-Z_6)^2}$$

$$L_{17}=L_{71}=\sqrt{(X_1-X_7)^2+(Y_1-Y_7)^2+(Z_1-Z_7)^2}$$

$$L_{18}=L_{81}=\sqrt{(X_1-X_8)^2+(Y_1-Y_8)^2+(Z_1-Z_8)^2}$$

$$L_{23}=L_{32}=\sqrt{(X_2-X_3)^2+(Y_2-Y_3)^2+(Z_2-Z_3)^2}$$

$$L_{24}=L_{42}=\sqrt{(X_2-X_4)^2+(Y_2-Y_4)^2+(Z_2-Z_4)^2}$$

$$L_{25}=L_{52}=\sqrt{(X_2-X_5)^2+(Y_2-Y_5)^2+(Z_2-Z_5)^2}$$

$$L_{26}=L_{62}=\sqrt{(X_2-X_6)^2+(Y_2-Y_6)^2+(Z_2-Z_6)^2}$$

$$L_{27}=L_{72}=\sqrt{(X_2-X_7)^2+(Y_2-Y_7)^2+(Z_2-Z_7)^2}$$

$$L_{28}=L_{82}=\sqrt{(X_2-X_8)^2+(Y_2-Y_8)^2+(Z_2-Z_8)^2}$$

$$L_{34}=L_{43}=\sqrt{(X_3-X_4)^2+(Y_3-Y_4)^2+(Z_3-Z_4)^2}$$

$$L_{35}=L_{53}=\sqrt{(X_3-X_5)^2+(Y_3-Y_5)^2+(Z_3-Z_5)^2}$$

$$L_{37}=L_{73}=\sqrt{(X_3-X_7)^2+(Y_3-Y_7)^2+(Z_3-Z_7)^2}$$

$$L_{38}=L_{83}=\sqrt{(X_3-X_8)^2+(Y_3-Y_8)^2+(Z_3-Z_8)^2}$$

$$L_{45}=L_{54}=\sqrt{(X_4-X_5)^2+(Y_4-Y_5)^2+(Z_4-Z_5)^2}$$

$$L_{46}=L_{64}=\sqrt{(X_4-X_6)^2+(Y_4-Y_6)^2+(Z_4-Z_6)^2}$$

$$L_{47}=L_{74}=\sqrt{(X_4-X_7)^2+(Y_4-Y_7)^2+(Z_4-Z_7)^2}$$

$$L_{48}=L_{84}=\sqrt{(X_4-X_8)^2+(Y_4-Y_8)^2+(Z_4-Z_8)^2}$$

$$L_{56}=L_{65}=\sqrt{(X_5-X_6)^2+(Y_5-Y_6)^2+(Z_5-Z_6)^2}$$

$$L_{57}=L_{75}=\sqrt{(X_5-X_7)^2+(Y_5-Y_7)^2+(Z_5-Z_7)^2}$$

$$L_{58}=L_{85}=\sqrt{(X_5-X_8)^2+(Y_5-Y_8)^2+(Z_5-Z_8)^2}$$

$$L_{67}=L_{76}=\sqrt{(X_6-X_7)^2+(Y_6-Y_7)^2+(Z_4-Z_7)^2}$$

$$L_{68}=L_{86}=\sqrt{(X_6-X_8)^2+(Y_6-Y_8)^2+(Z_4-Z_8)^2}$$

$$L_{78}=L_{87}=\sqrt{(X_7-X_8)^2+(Y_7-Y_8)^2+(Z_7-Z_8)^2}$$

The 28 equations may be represented as follows.

$$L_{ij}=L_{ji}=\sqrt{(X_i-X_j)^2+(Y_i-Y_j)^2+(Z_i-Z_j)^2}$$

Wherein I, j=1, 2, . . . , M+N.

Further, the aforementioned apparatus and method are not limited to configurations and methods of the above-described embodiments. Alternatively, the embodiments may be configured by selectively combining the whole of the respective embodiments or a part thereof to allow various modifications.

DESCRIPTION OF THE SYMBOLS

100: a ground base point station
110: an assistant point station
120: an assistant point calculation server
130: position calculation terminal
G1: a first ground base point station
G2: a second ground base point station
A3~A8: first-sixth assistant point stations

What is claimed is:

1. A spatial coordinate positioning system comprising:
at least one ground base point station of which position information was already determined and which has a laser distance measurement function and a wireless distance measurement function;
a plurality of assistant point stations which have a wireless distance measurement function; and
an assistant point position calculation server which receives laser distance information between each of the as least one ground base point station and a specific assistant point station of the plurality of assistant point stations, first wireless distance information between each of the at least one ground base point station and each of the plurality of assistant point stations except for the specific assistant point station, and second wireless distance information between the plurality of assistant point stations at a predetermined time, and calculates position information of the plurality of assistant point stations at a predetermined time, on the basis of the laser distance information, the first wireless distance information, the second wireless distance information, and the position information of the at least one ground base point station.

2. The spatial coordinate positioning system according to claim 1, wherein
the assistant point position calculation server calculates position information (Xn, Yn, Zn) of each of the plurality of assistant point stations, on the basis of the following equation for each distance information (Lij) with respect to the laser distance information, the first wireless distance information, and the second wireless distance information, $$L_{ij}=L_{ji}=\sqrt{(X_i-X_j)^2+(Y_i-Y_j)^2+(Z_i-Z_j)^2}$$

wherein i, j=1, 2, ..., M+N, M is the number of the at least one ground base point station and N is the number of the plurality of assistant point stations.

3. The spatial coordinate positioning system according to claim 1, wherein
the plurality of assistant point stations are composed of a main assistant point station and a sub assistant point station, and the main assistant point station collects the second wireless distance information and transmits the second wireless distance information to the assistant point position calculation server.

4. The spatial coordinate positioning system according to claim 1, wherein
the at least one ground point station transmits the laser distance information and the second wireless distance information to the assistant point position calculation server.

5. A spatial coordinate positioning system comprising:
at least one ground base point station of which position information was already determined and which has a laser distance measurement function and a wireless distance measurement function; and
a plurality of assistant point stations which have a wireless distance measurement function, wherein
the at least one ground base point station receives wireless distance information between the plurality of assistant point stations at a predetermined time and calculates position information of the plurality of assistant point stations at a predetermined time on the basis of laser distance information between a specific assistant point station of the plurality of assistant point stations and each of the at least one ground base point station, the wireless distance information, and the position information of the at least one ground base point station.

6. The spatial coordinate positioning system according to claim 5, wherein
the at least one ground base point station calculates position information $(X_n, Y_n, Z_n)$ of each of the plurality of assistant point stations, on the basis of the following equation for each distance information $(L_{ij})$ with respect to the laser distance information and the wireless distance information, $$L_{ij} = L_{ji} = \sqrt{(X_i - X_j)^2 + (Y_i - Y_j)^2 + (Z_i - Z_j)^2}$$

wherein i, j=1, 2, ..., M+N, M is the number of the at least one ground base point station and N is the number of the plurality of assistant point stations.

7. The spatial coordinate positioning system according to claim 5, wherein
the plurality of assistant stations are composed of a main assistant point station and a sub assistant point station, and the main assistant point station collects the wireless distance information and transmits the wireless distance information to the at least one ground base point station.

8. A ground base point station comprising:
a laser module which includes a light source emitting laser and a light receiving portion detecting reflected laser,
a distance measurement portion which calculates laser distance information with an assistant point station on the basis of time information related to emission and detection of laser;
a wireless communication portion which transmits and receives a radio signal to and from the assistant point station and transmits wireless distance information to an assistant point position calculation server, and
a control portion which controls the laser module, allowing transmitting laser distance information calculated from the distance measurement portion through the wireless communication portion.

9. The ground base point station according to claim 8, wherein
the wireless communication portion receives wireless distance information from the assistant point station and transmit received wireless distance information to the assistant point position calculation server.

10. The ground base point station according to claim 8, wherein
the wireless communication portion receives position information of the assistant point station from the assistant point position calculation server, followed by transmission to the assistant point station.

11. A method for calculating spatial coordinates of a plurality of assistant point stations by an assistant point position calculation device in a spatial coordinate positioning system composed of at least one ground base point station of which spatial coordinate was known and the plurality of assistant point stations of which spatial coordinates were not known, comprising steps of:
receiving laser distance information between each of the at least one ground base point station and a specific assistant point station of the plurality of assistant point stations;
receiving wireless distance information between the plurality of assistant point stations;
generating a system of equations for each of the distance information $(L_{ij})$ with respect to the laser distance information and the multiple wireless distance information, $$L_{ij} = L_{ji} = \sqrt{(X_i - X_j)^2 + (Y_i - Y_j)^2 + (Z_i - Z_j)^2}$$

wherein i, j=1, 2, ..., M+N, M is the number of the at least one ground base point station and N is the number of the plurality of assistance point stations; and
calculating spatial coordinates $(X_n, Y_n, Z_n)$ of the plurality of assistant point stations from the system of equations.

* * * * *